June 6, 1939. E. C. MUELLER 2,161,483
AUTOMATIC PHONOGRAPH
Filed Jan. 5, 1938 9 Sheets-Sheet 1

Inventor:
Emil C. Mueller
By Fisher, Clapp, Soans + Pond Attys.

June 6, 1939.　　　　　E. C. MUELLER　　　　　2,161,483
AUTOMATIC PHONOGRAPH
Filed Jan. 5, 1938　　　　9 Sheets-Sheet 3

Inventor.
Emil C. Mueller
By Fisher, Clapp, Soans & Pond Attys.

June 6, 1939. E. C. MUELLER 2,161,483
AUTOMATIC PHONOGRAPH
Filed Jan. 5, 1938 9 Sheets-Sheet 5

Inventor:
Emil C. Mueller
By Fisher, Clapp, Soans & Pond Attys.

June 6, 1939. E. C. MUELLER 2,161,483
AUTOMATIC PHONOGRAPH
Filed Jan. 5, 1938 9 Sheets-Sheet 6

Inventor
Emil C. Mueller
By Fisher, Clapp, Soans & Pond Attys.

June 6, 1939.  E. C. MUELLER  2,161,483
AUTOMATIC PHONOGRAPH
Filed Jan. 5, 1938  9 Sheets-Sheet 7
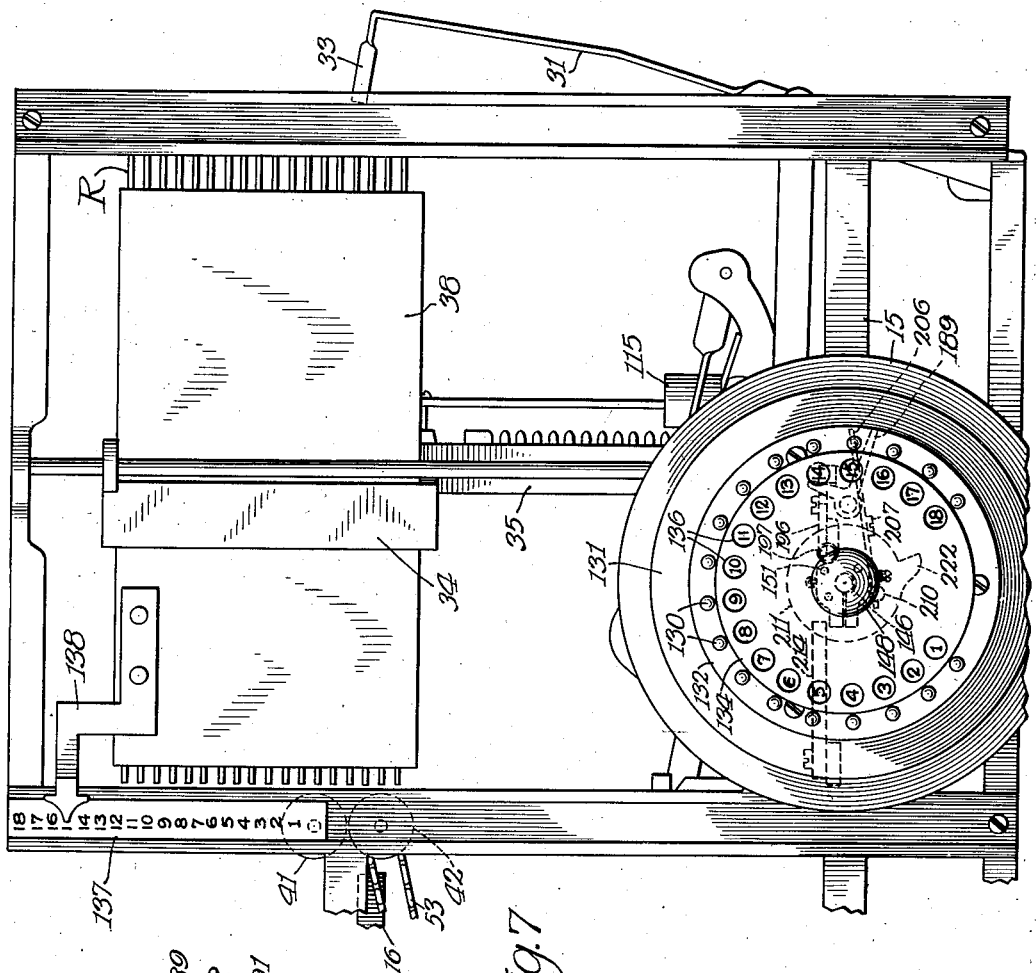
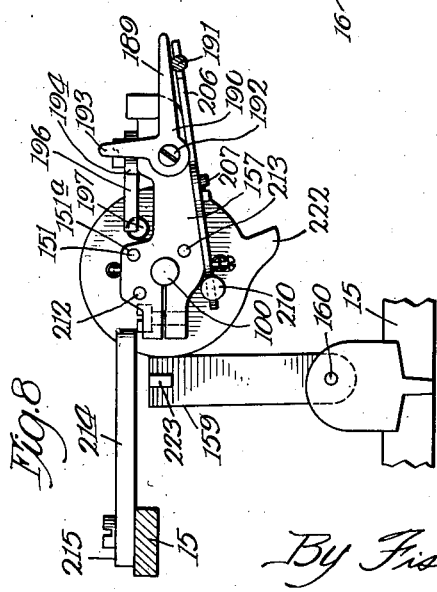
Inventor:
Emil C. Mueller
By Fisher, Clapp, Soans & Pond Attys.

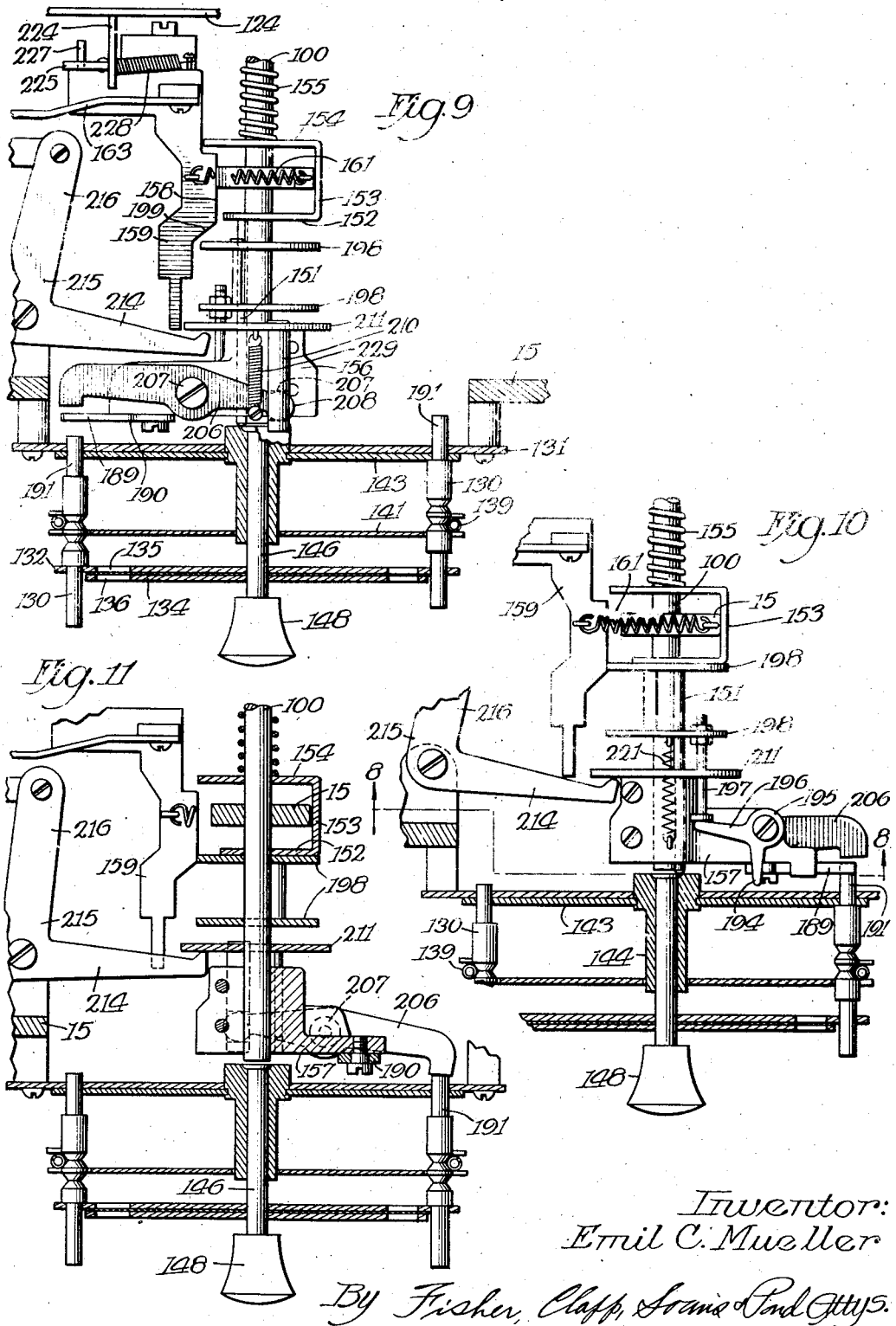

Patented June 6, 1939

2,161,483

UNITED STATES PATENT OFFICE 2,161,483

AUTOMATIC PHONOGRAPH

Emil C. Mueller, Chicago, Ill., assignor to John Gabel Manufacturing Company, Chicago, Ill., a corporation of Illinois Application January 5, 1938, Serial No. 183,533

14 Claims. (Cl. 274—10)

This invention relates to improvements in automatic phonographs and the main objects of the invention are to provide an automatic phonograph which may be caused to play the records with which it is supplied in successive order in accordance with their arrangement in the record magazine; to provide an arrangement wherein, if desired, any pre-determined record in the magazine may be selected for immediate playing regardless of the position of the magazine, and to provide an arrangement wherein two or more records, regardless of their relative position in the record magazine, may be selected for successive playing.

Other objects of the invention are to provide mechanism of the character above indicated which will be relatively simple but highly efficient and effective for the purpose indicated; to provide such mechanism which will be durable and capable of withstanding rough treatment such as is often accorded devices of this character and in general it is the object of the invention to provide an improved automatic phonograph.

Other objects and advantages of the invention will be understood by reference to the following specification and accompanying drawings (nine sheets) wherein there is illustrated an automatic phonograph embodying a selected form of the invention.

Figure 1:
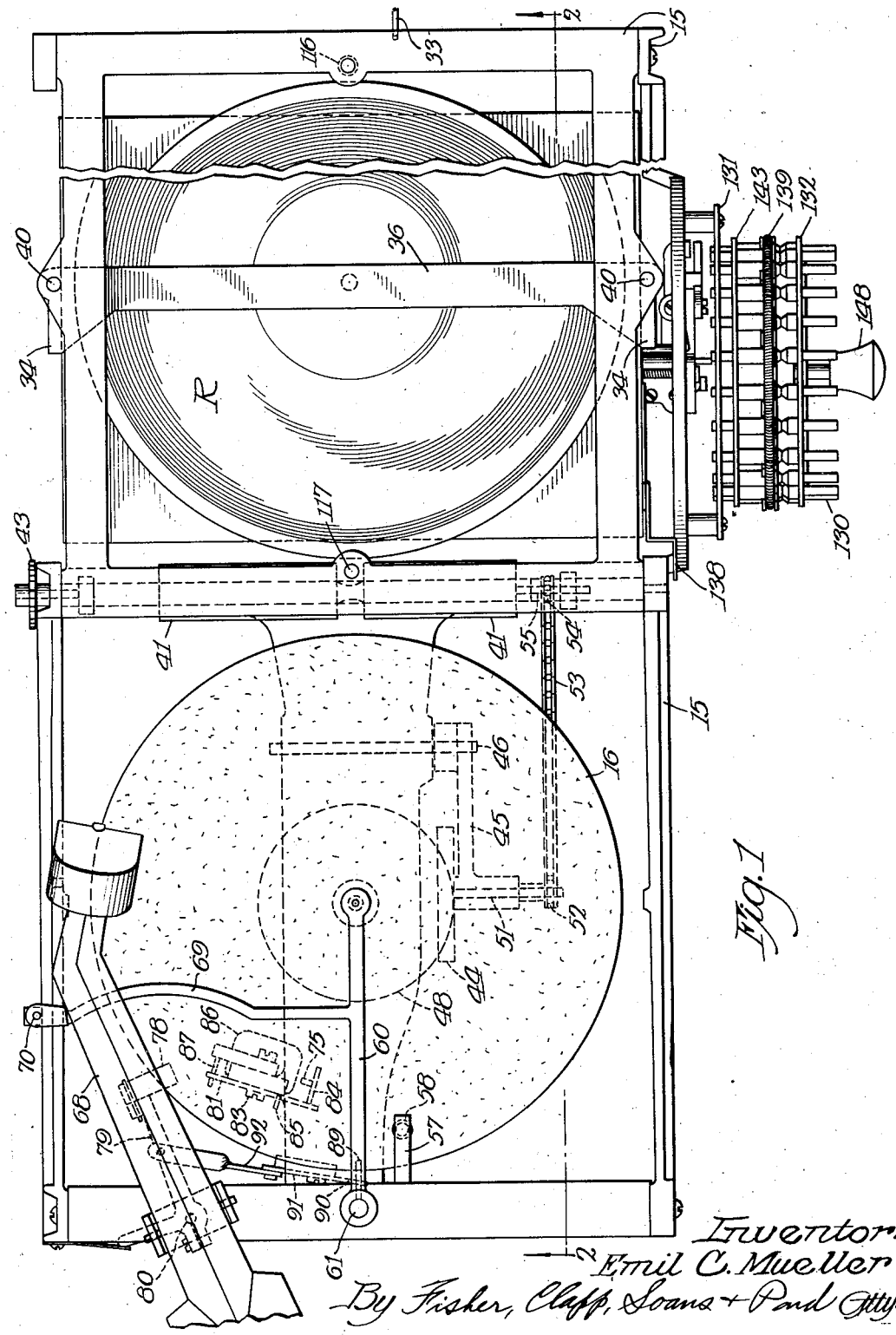
Figure 2:
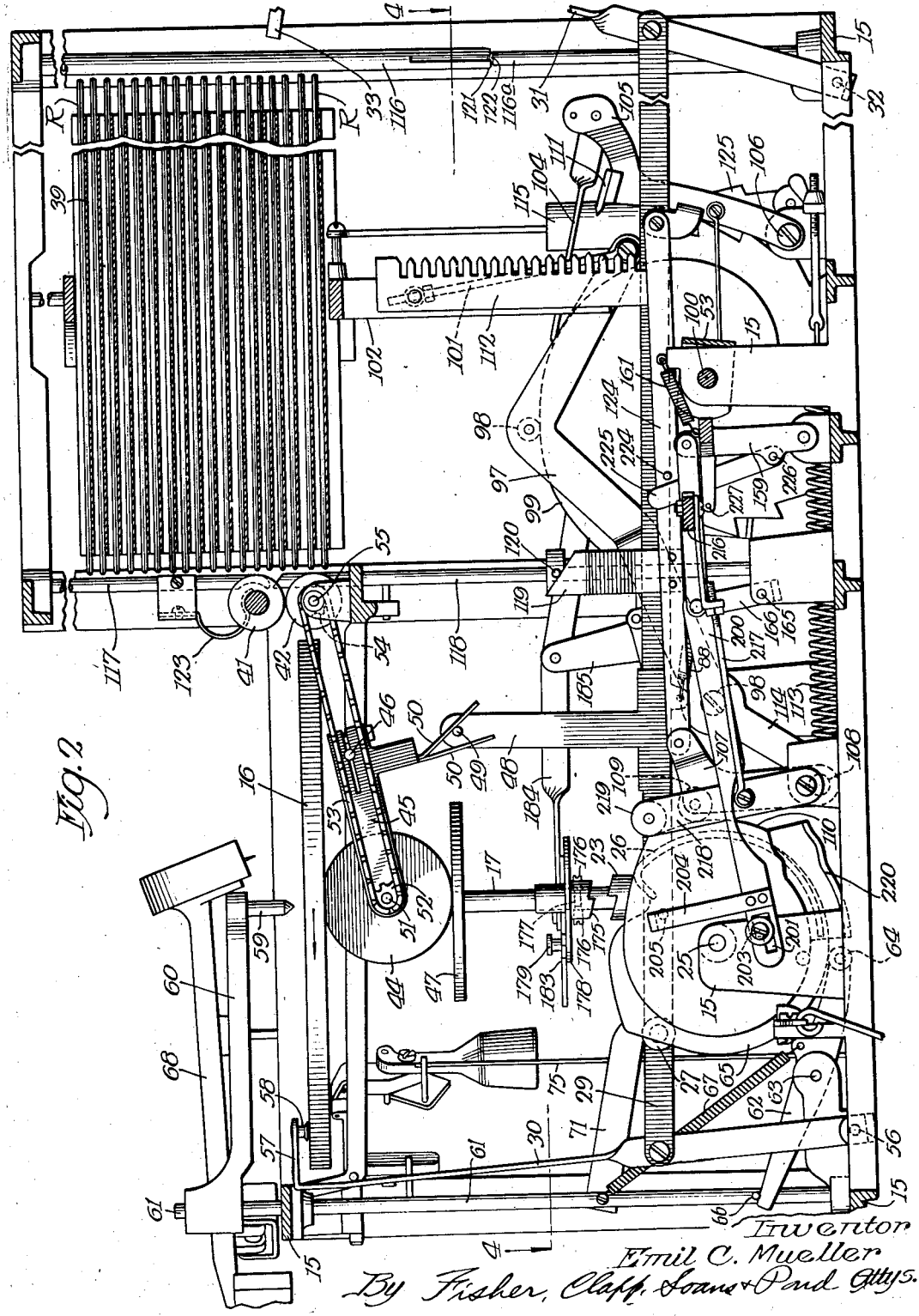
Figure 3:
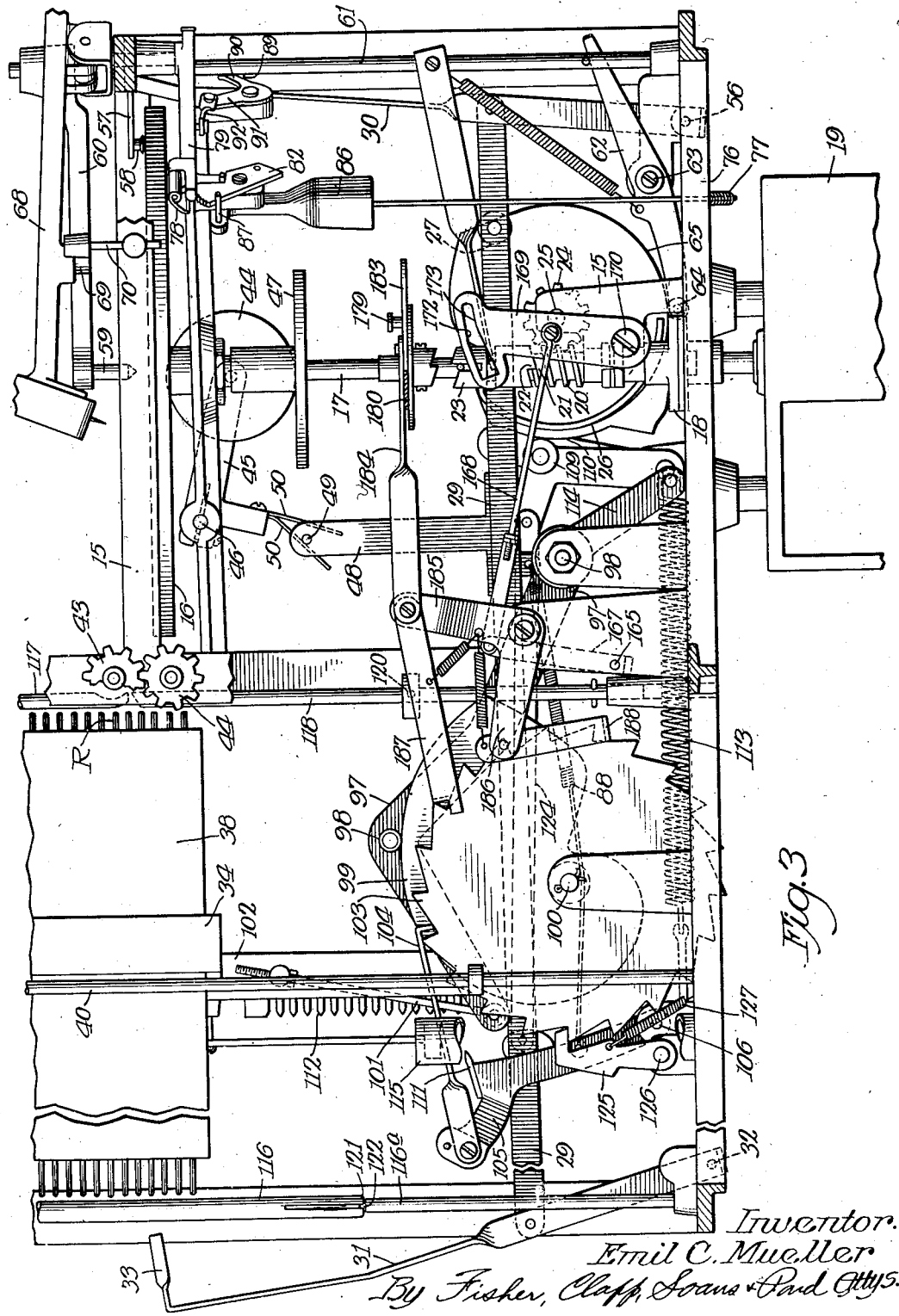
Figure 4:
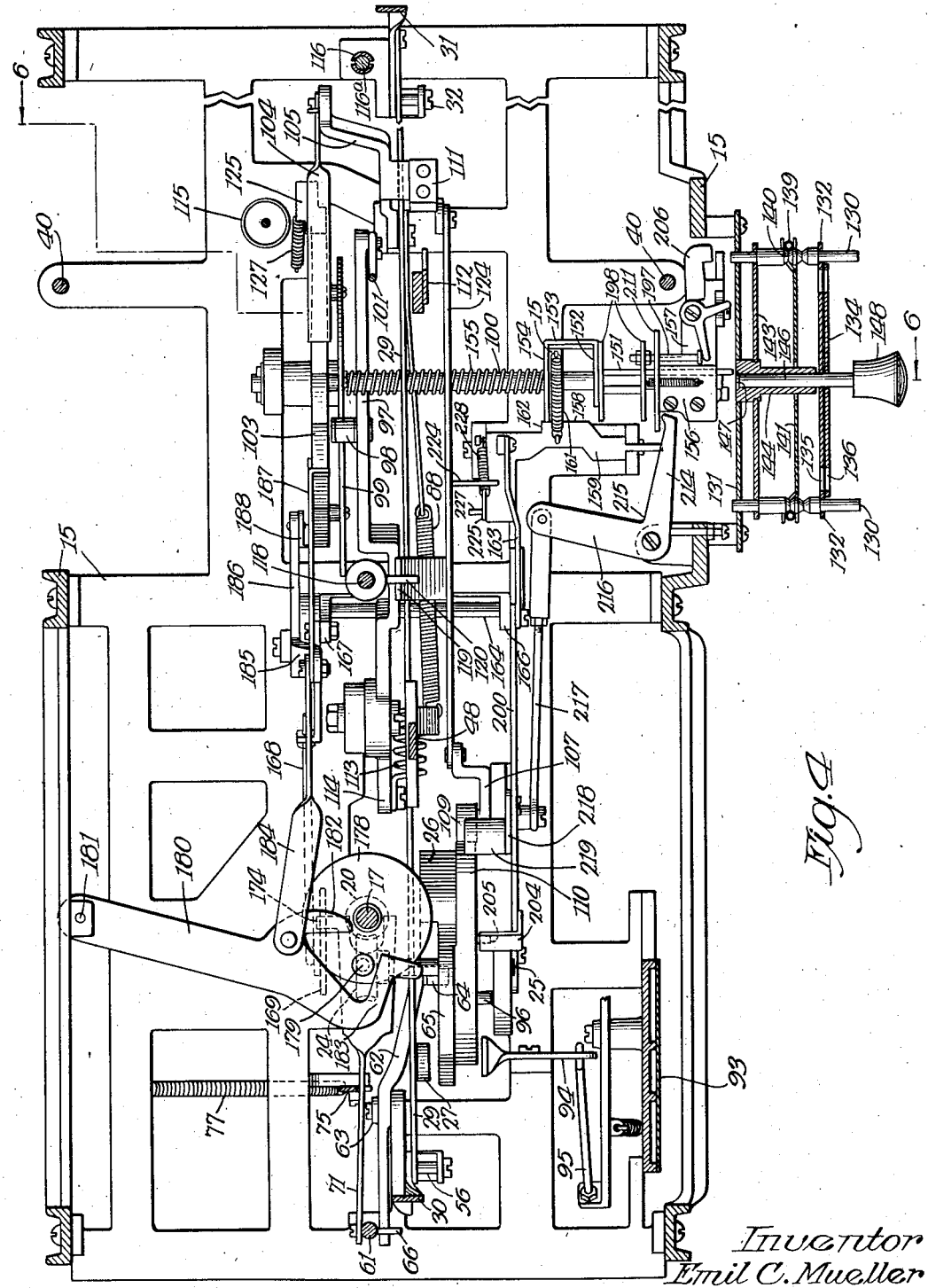
Figure 5:
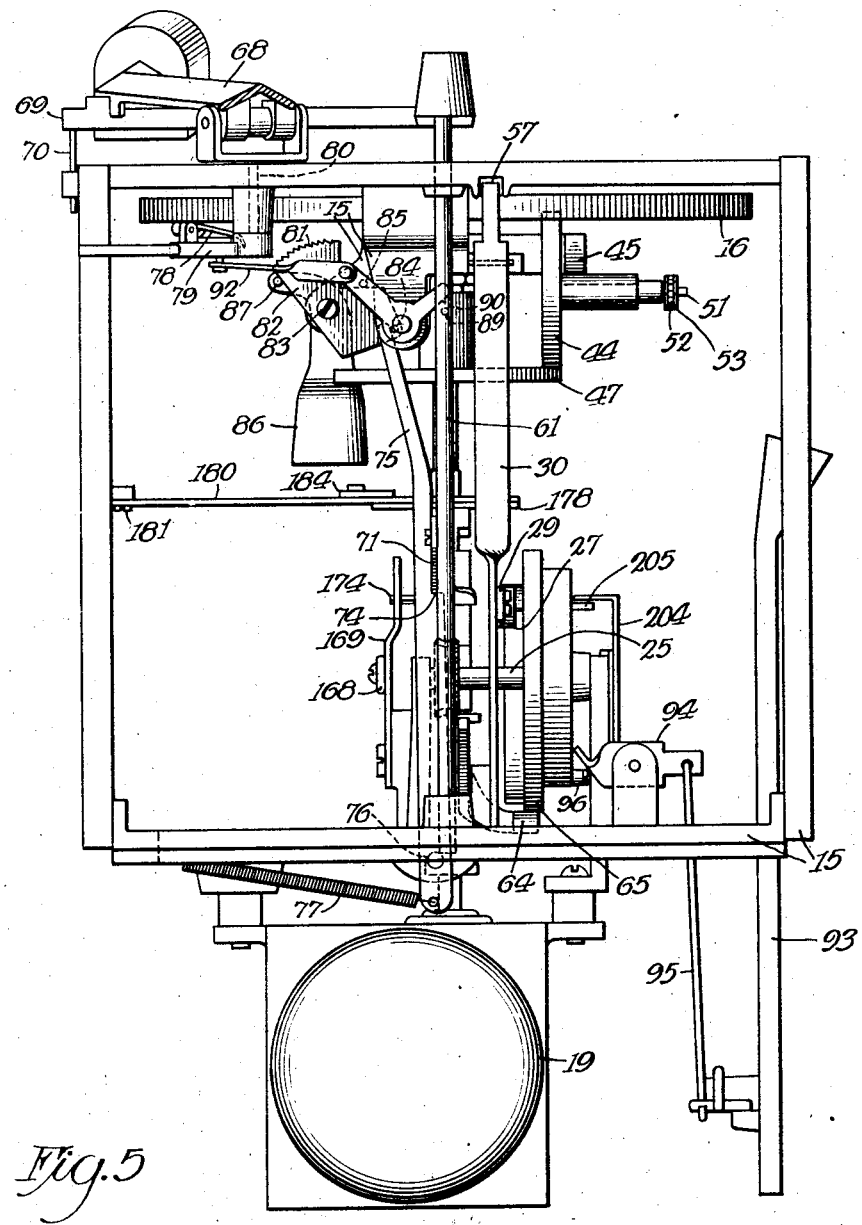
Figure 6:
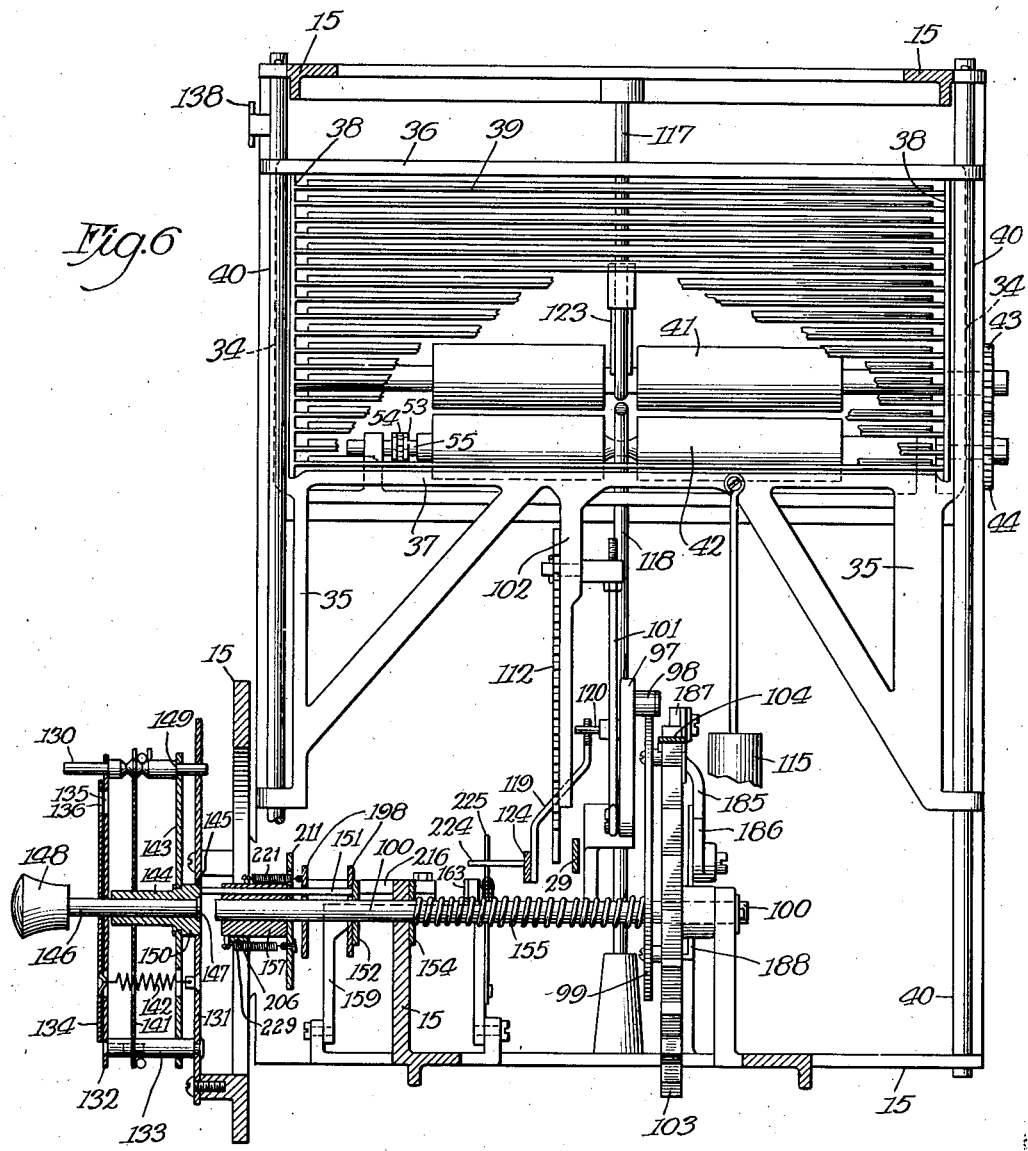
Figure 12:
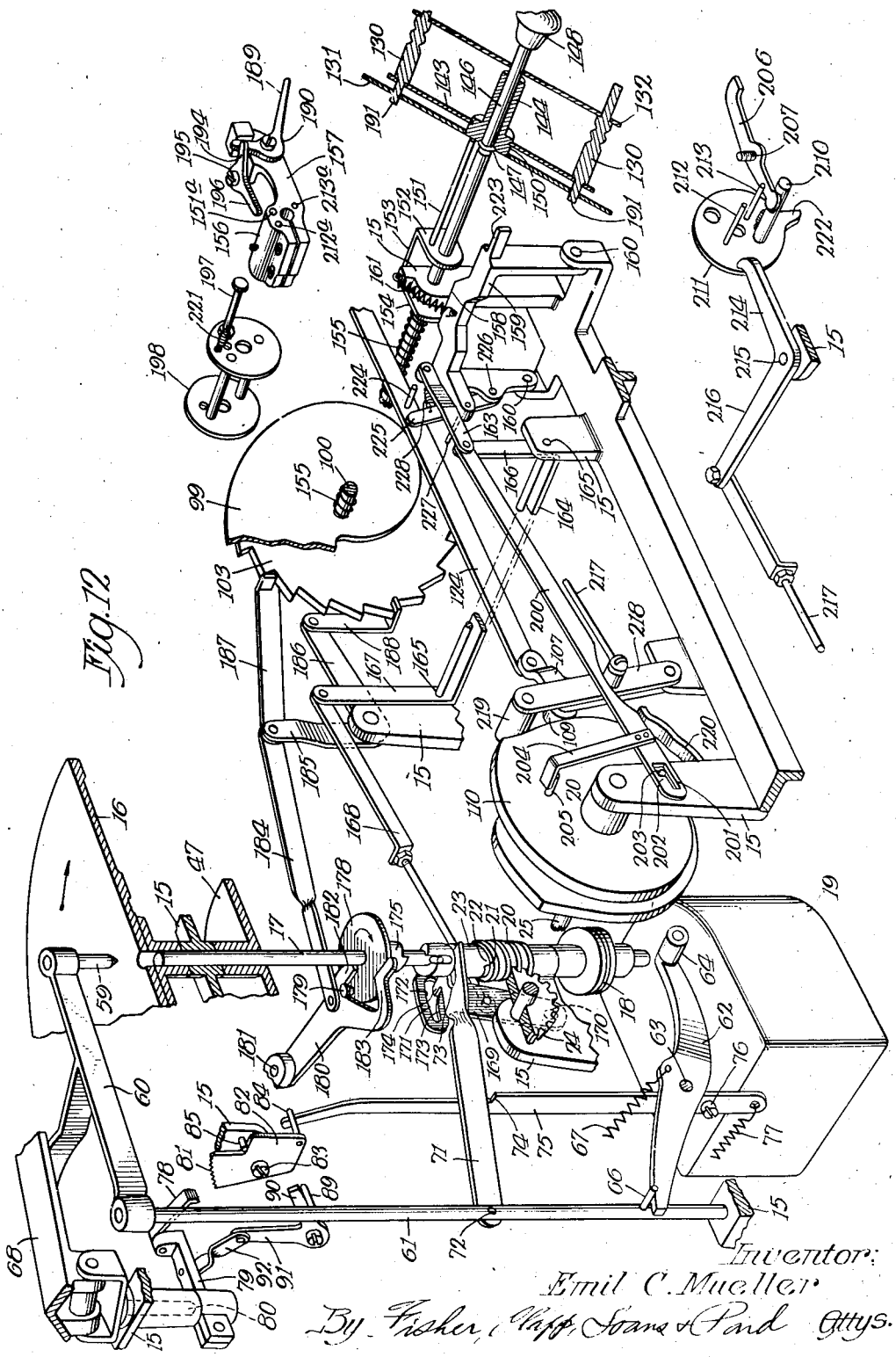

In the drawings, Figure 1 is a plan, Figure 2 is a section on the line 2—2 of Figure 1, Figure 3 is an elevation of the side of the mechanism opposite to that shown in Figure 2, Figure 4 is a plan section on the line 4—4 of Figure 2, Figure 5 is an end elevation illustrating the left-hand end of the structure as shown in Figure 1, Figure 6 is a section substantially on the line 6—6 of Figure 4 and the line 6—6 of Figure 7, Figure 7 is a fragmentary side elevation, Figures 8, 9, 10 and 11 are fragmentary sections illustrating certain details of the selecting mechanism of the structure and Figure 12 is a perspective in more or less diagrammatical form illustrating the relationship of certain parts of the mechanism.

The automatic phonograph mechanism herein disclosed embodies substantially the automatic phonograph mechanism illustrated in Patent No. 2,087,095 issued in my name on July 13, 1937. As shown, the mechanism comprises a main frame structure, the parts of which are designated 15, it being understood that the frame may be of cast iron or any other suitable form. In general, the frame 15 is rectangular in form, one end portion being built up higher than the other to actuate a record magazine as best shown in Figure 2.

A turn table 16 is mounted on the upper end of a shaft 17 so as to rotate therewith, the shaft being connected by a suitable coupling such as indicated at 18 or otherwise to the driven shaft of an electric motor 19. The arrangement is such that whenever the motor 19 is energized, the turn table 16 is rotated.

A worm gear 20 is mounted on the shaft 17 so as to be rotatable thereon. Its upper end is provided with notches such as indicated at 21 into which may drop teeth such as shown at 22 formed on the lower end of a sleeve 23. The sleeve 23 is keyed to the shaft 17 so as to be slidable lengthwise thereof but so as to be rotated therewith. The sleeve 23 constitutes a movable clutch member in that it may be adjusted into and out of drive connection with the worm gear 20.

The worm gear 20 meshes with a worm wheel 24 which is secured to a transversely extending cam shaft 25, the latter being journalled in suitable lugs or bosses mounted on or formed integrally with the frame 15.

The shaft 25 carries a cam structure including a cam element 26 which is adapted to engage a roller 27 carried by a link 29 which extends between and connects vertically disposed record shifting arms 30 and 31, respectively.

When the motor is energized, and the cam shaft 25 driven, the cam 26, upon engaging the roller 27 will serve to move the link 29 endwise (to the left in Figure 2 and to the right in Figure 3). Such movement of the link 29 serves to rock the record shifting member 31 on its pivot mounting 32 in the frame structure so as to cause the upper end 33 of the shifter to move inwardly. In its movement inwardly, the record shifter end portion 33 engages the adjacent marginal portion of one of the records "R" in the record magazine. As best shown in Figures 2 and 6, the record magazine comprises a frame-like member having a pair of upwardly extending legs, 34—34, on opposite sides of the magazine. It also comprises depending leg portions, 35—35, and top and intermediate cross-members 36 and 37, respectively. The upwardly extending legs 34—34 and top and intermediate cross-members 36 and 37 serve to support a suitable sheet metal rack structure comprising opposite side walls 38—38 and partitions or shelves 39 which form between them record storage spaces. The upper cross-member 36 has end extensions which are apertured to receive guide rods 40—40 which extend vertically between upper and lower portions of the frame 15. The lower ends of the legs 35—35 are similarly equipped with lateral extensions also apertured to slidably fit on said guide rods 40—40.

As best shown in Figure 2, the records "R" project rearwardly beyond the supporting shelves 39 and they are spaced sufficiently to permit the vertical width of the record shifter end portion 33 to enter between alternate records whereby said shifter end portion may operate to shift an intermediate record laterally toward the turn table of the machine.

A record shifted as above described in the magazine enters between upper and lower record transfer rollers 41 and 42, respectively, which are driven so as to continue the movement of the record until it is deposited on the turn table 16. The upper and lower transferring rollers 41 and 42 are interconnected for rotation in opposite directions by means of gears 43 and 44 which are respectively secured to the shaft of said upper and lower transferring rollers. The gears 43 and 44 are the type which have deep teeth so as to permit vertical separation of the rollers 41 and 42 as required by the passage therebetween of a record, without unmeshing the said gears.

Rotation of the record transferring rollers 41 and 42 is effected by a driving connection to the turn table shaft 17. Such driving connection comprises a wheel 44 (see Figures 1 and 2) which is journalled in one end of an arm 45, the latter being pivoted as indicated at 46 for rocking movement.

As shown in Figure 2, the arm 45 and its wheel 44 are in a lowered position in which the wheel frictionally engages the top surface of a drive disk 47 which is secured to the turn table shaft 17. When the link 29 is shifted endwise (to the left in Figure 2) as above explained, the arm 45 is incidentally caused to rock upwardly so as to effect driving engagement between the wheel 44 and a suitably surfaced bottom portion 48 of the turn table. Such upward rocking of the arm 45 and wheel 44 is effected by means of the upwardly extending arm 48 which is rigidly secured to the link 29. The upper end of said arm 48 is provided with a pin 49 which is interposed between flat spring members 50—50 which are secured to and depend from a lug formed integrally with the arm 45. It will be observed that when the link 29 moves to the left from its position as shown in Figure 2, the pin 49 will engage the left-hand spring member 50 and thereby effect upward rocking movement of the arm 45. The described arrangement also serves to resiliently or yieldingly maintain the arm 45 in upwardly rocked position and the wheel 44 correspondingly in driving engagement with the bottom of the turn table 16.

When the wheel 44 is driven by engagement with the bottom of the turn-table, it will, of course, rotate in a counter-clockwise direction as viewed in Figure 2. Such rotation of the wheel 44 is imparted through its shaft 51, a sprocket 52 thereon and a chain 53 to a sprocket 54 mounted on the shaft 55 of the lower record transfer roller 42. Thus, the rollers 41 and 42 will be driven in the proper direction for transferring the record from the magazine to the turn table.

As shown in Figure 2, the record shifting arm 30 is pivoted at its lower end to the main frame structure as indicated at 56 and its upper end has a laterally extending portion 57 extending inwardly over a marginal portion of the turn table 16. The inner end of said laterally extending portion 57 is equipped with a depending stud 58 which is adapted to engage the periphery of a record on the turn table to initiate the return of the record from the turn table to the magazine. It will be noted, however, that when the link 29 is moved to the left as previously described, the record shifting arm 30 will be correspondingly rocked so that the laterally extending upper end portion 57 of the arm will be swung clear of the turn table so as not to interfere with the proper positioning thereon of a record.

When the record has been properly deposited on the turn table, a centering device comprising a centering pin 59 is lowered to properly center the record on the turn table. Said centering pin 59 is mounted on the inner end of an arm 60 which, at its other end, is secured to the upper end of a rod 61 which is vertically slidable in suitable openings provided in the adjacent frame portions 15.

The rod 61, together with the arm 60 and centering pin 59, is supported in the elevated position shown in Figure 2 by means of a cam controlled rock lever 62 (see Figures 2 and 4). The said rock lever is pivotally mounted intermediate its ends as indicated at 63 and has its inner end provided with a roller 64 which engages the periphery of a cam 65. The other end of the rock lever 62 extends beneath and engages a cross-pin 66 carried by the rod 61. A spring 67 tensioned between the rod 61 and the rock lever 62 normally tends to pull the rod 61 downwardly and to rock the rock lever upwardly at its inner end so as to maintain its roller 64 in engagement with the cam 65. By the time the record has been transferred to the turn table as above explained, the cam shaft 25 and the cams carried thereby will be rotated (in a counter-clockwise direction in Figure 2) somewhat less than one-half a turn. The cam 65 is so formed that at the proper time, the cam follower 64 will be permitted to rise and the outer end of the rock lever 62 correspondingly lowered. The lowering movement thus permitted is sufficient to effect lowering of the record centering pin 59 to the extent necessary for effectively centering and retaining the record in proper centered position on the turn table.

A reproducing or electrical pick-up arm designated 68 is suitably mounted as best indicated in Figures 1, 2, 3 and 5 for both vertical and horizontal rocking movement. Said arm extends over a branch or arm 69 of the record centering arm 60. When the record centering arm 60 is in its elevated position, as shown in Figures 2 and 3, said branch or arm 69 is in engagement with a bottom portion of the pick-up arm 68 and supports the latter in an upwardly tilted position wherein its record-engaging needle is spaced upwardly from the turn table and any record thereon so as to avoid interference with the transferring movement of the record. When the centering device is lowered, the pick-up supporting branch 69 will be correspondingly lowered and will permit the needle of the pick-up device to operatively engage the sound grooves of the record then on the turn table. The outer or free ends of the branch arm 69 may conveniently be guided by a sliding pin arrangement such as shown at 70 in Figures 1, 3 and 5. Such guide means serves to prevent lateral movement of the outer end portion of said branch arm and thereby guards against accidental breakage of said branch.

During the downward movement of the vertically slidable rod 61, a clutch-controlling lever 71 is actuated to disengage the clutch member 23 from the worm gear 20 so as to stop the rotation of the cam shaft 25 when the pick-up device is in operative engagement with the record. The clutch-controlling lever 71 is pivoted at its outer end as shown at 72 to the vertically movable rod 61 and the other end of said lever is forked as shown at 73 to embrace a reduced portion of the clutch member 23. Intermediate its ends, the lever 71 engages a shoulder 74 formed on a vertically disposed arm 75 which is pivoted as indicated at 76 near its lower end. The arm 75 is normally urged to swing in a clockwise direction as viewed in Figure 5 by suitable spring means such as indicated at 77, such swinging movement being limited by engagement of the edge of the arm 75 with the adjacent face of the lever 71.

When the playing of the record on the turn table is completed, the arm 75 is automatically moved to the left (as viewed in Figure 5) to remove the shoulder 74 thereof from supporting engagement with the lever 71. Thereupon the clutch member 23 slides downwardly until it comes into operative engagement with the worm gear 20, whereby rotation of the cam shaft 25 is again initiated.

The means for effecting the described movement of the arm 75 for causing said engagement of the clutch comprises a pawl 78 pivoted to the free end of an arm 79 carried by the lower end of a shaft 80 which constitutes the pivot shaft for horizontal swinging movement of the pick-up device. The shaft 80 is connected to the pick-up device so that the shaft turns about a vertical axis in unison with the swinging movement of the pick-up. The pawl 78 is adapted to engage one of a plurality of teeth 81 on a member 82 which is pivoted as shown at 83 to a frame part 15 provided for that purpose. The pivoted member 82 is equipped with a pin 84 which is adapted to engage the upper end of the arm 75. By inspection of Figures 5 and 12 it will be apparent that when the pawl 78 engages one of the teeth 81 and rocks the pivoted member 82 in a clockwise direction, the pin 84 will engage the arm 74 and swing it counter-clockwise to thereby disengage said supporting shoulder 74 from the lever 71.

The pivot 83 for the member 82 is so located that the member 82 normally tends to rock in a clockwise direction as viewed in Figures 5 and 12 so that the pin 84 normally rests on the upper end of said arm 75. The normal tendency of the arm 75 to swing in a clockwise direction resists rotation of the toothed member 82 and normally urges the toothed member to rock in a counter-clockwise direction. Such counter-clockwise movement of the toothed member is prevented by a stop-pin 85 which is carried by the frame element 15 and arranged to engage a shoulder formed on the toothed member as shown.

Under certain circumstances it has been found that the proper operation of the described mechanism may be prevented by tipping the upper portion of the apparatus rearwardly. To prevent unauthorized tampering with the normal operation of the mechanism in such a manner a weight 86 is pivoted coaxially with the pivot toothed member 82 and such weight provided with an offset portion carrying a pin 87 adapted to engage the lefthand edge of the toothed member as shown in Figure 5. The weight 86 is free to swing on its pivot so that in the event the machine is tipped as above mentioned, the weight will tend to maintain its normal vertical position, thereby incidentally effecting clockwise rotation of the toothed member 81 to thereby disengage said supporting shoulder 74 from the lever 71. Hence, if the machine is tipped as aforesaid, the operation of the machine will be stopped just as though the playing of a record were completed. It will be understood that the records now in use are equipped with a quick spiral or eccentric terminal groove which guides the free end of the pick-up inwardly a substantial distance immediately upon completion of the playing of the selection. Such accelerated movement of the pick-up arm brings the pawl 78 into operative engagement with the teeth 81 of the member 82 and effects the operations already described.

Upon completion of the playing of a record the cam shaft 25 resumes its turning movement in a counterclockwise direction as viewed in Figures 2 and 12 (clockwise in Figure 3). The cam 26 leaves the roller 27 on the link 29 so as to permit a spring 88 to effect movement of the link 29 (to the right in Figures 2 and 4 and to the left in Figure 3). However, before the cam 26 frees the link 29 for such movement, the cam 65 serves to rock the lever 62 so as to cause its outer end to move upwardly, thereby imparting upward movement to the rod 61. Upward movement of the rod 61 raises the record centering pin 59 to the position illustrated in the drawings, thereby freeing the record for lateral return movement to the magazine. Such upward movement of the rod 61 also raises the pick-up from the record and also effects outward swinging movement of the pick-up to restore it to starting position.

The said outward swinging movement of the pick-up is effected by means of a pin 89 arranged to engage one arm 90 of a pivoted bell crank member, the other arm 91 is connected by means of a link 92 to the arm 79.

The cams 65 and 26 are so arranged relative to each other that movement of the link 29 is not initiated until after the centering pin has been withdrawn from the centering opening in the record. However, incident to the following movement of the link 29, the record shifting member 30 is caused to swing to the right as viewed in Figure 2 so that its record engaging element 58 engages the adjacent edge of the record and feeds the record laterally into the bite of the record transferring rolls 41 and 42. Also incident to the said movement of the link 29, the arm 45 is permitted to swing downwardly so as to effect driving engagement between its wheel 41 and the driving disk 47 carried by the turn table shaft 17. By this means the record transferring rolls 41 and 42 are driven in the proper direction to feed the record from the turn table to the magazine.

It will, of course, be understood that the phonograph mechanism may be provided with a switch for turning the motor 19 on and off so that the machine may be permitted to operate continuously for whatever period is desired, or that the machine may be provided with coin control or other similar means for governing the operation of the device. By way of example, the machine may be equipped with a coin control device such as shown in my co-pending application, Serial No. 137,723. Such coin control mechanism is indicated generally at 93 in Figures 4 and 5. The coin control mechanism 93 includes an electrical switch for controlling the motor 19 and it includes a mechanical connection to the operating mechanism of the phonograph apparatus. In this instance such mechanical connection is indicated as comprising a rock lever 94 and a link 95 connecting one end of the rock lever 93 with the coin control mechanism. The opposite end of the rock lever 94 is suitably shaped and positioned to be acted upon by a pin or stud 96 which projects from the face of the cam structure. The magazine is elevated one step to place a new record in horizontal alignment with the bite of the record transferring rolls. The arrangement for raising the record magazine one step comprises an angularly formed arm 97 which is pivoted near one end as indicated at 98. The arm 97 is provided with a roller 98 which rests against the periphery of a suitable cam 99, the latter being mounted for rotation on a shaft 100. At its free end beyond the roller 98, the arm 97 is connected by means of a link 101 to a depending leg 102 of the record magazine frame structure (see Figure 6).

A ratchet wheel 103 is rigidly connected with the cam 99 and is adapted to be rotated step by step by means of a pawl 104 which is carried by the upper end of a pivoted arm 105. The lower end of the arm 105 is pivotally mounted as indicated at 106. The arm 105 is swung outwardly at its upper end (to the right in Figure 2) promptly after the record is returned to the magazine through the agency of a link 124 and cam following arm 107. The cam following arm 107 is pivoted as indicated at 108 and carries a roller 109 which rides on the periphery of a suitable cam 110 carried by the cam shaft 25. The cam 110 is suitably shaped to force the arm 105 outwardly at the proper time to effect the upward movement of the magazine as indicated. The spring 88, connected by the link 29 and the arm 105 (as best shown in Figure 3) serves to urge the cam following roller 109 to remain in contact with the periphery of the cam 110 and to effect the inward movement of the pawl 104 in preparation for a subsequent magazine elevating operation. During the return movement of the pawl 104, the ratchet wheel 103 is locked against reverse rotation by means of a pawl 125 which is pivoted at 126 and pulled into operative engagement with the ratchet wheel by means of a spring 127 (see Figure 3). The arm 105 is provided with a locking dog 111 which is designed to enter between the teeth of a rack 112 carried by the magazine frame part 102 to lock the magazine in fixed position. The magazine is so locked when the pawl 104 is in its inward position during the playing of a record on the turntable.

The magazine actuating cam 99 is rotated step by step in a counter-clockwise direction as shown in Figure 3. It will be observed that the cam is so shaped that when the roller 98 rides over the highest point of the cam, the roller will be permitted to descend quickly to the lowest point of the cam which is adjacent the axis thereof. Hence the magazine is permitted to descend under the force of gravity. Its descent is, however, cushioned by means of a helical spring 113 which is stretched between a fixed part of the frame of the apparatus and the free end of an extension 114 of the arm 97. To control further the descent of the magazine, a check such as a dash part 115 may be employed. The records in the magazine are prevented from shifting inwardly and outwardly during the vertical movement of the magazine by means of stationary guide rods carried by the framework of the machine. A guide rod at the rear of the magazine is indicated at 116 (in Figure 2) and a two-part guide rod comprising upper and lower parts 117 and 118, respectively, is provided at the front of the magazine. The lower section 118 of the front guide rod is slidable vertically and in Figure 2 is shown in its elevated position in which it obstructs the entrance to the bite of the rolls 41 and 42 and substantially closes the otherwise present gap between the adjacent ends of the upper and lower sections of the front guide rod. The adjustable lower section 118 of the front guide rod is actuated by means of a cam member 119 which is carried by the link 106. The member 119 has its upper end inclined and arranged to act on a pin 120 carried by the movable guide rod section 118. When the link 106 is moved to the right in Figure 2, the cam 119 is correspondingly moved under the pin 120 to thereby raise the lower guide rod section 118 for the purpose explained. It will be apparent that upon completion of the magazine elevating operation, the cam 119 will be returned to its initial position so as to permit the lower guide rod member 118 to be lowered, thereby to permit the next record to enter the bite of the rolls 41 and 42.

As indicated in Figure 2, the rear guide member 116 is in the form of a tubular member which fits telescopically over a lower guide element 116—A. The lower member 116—A is fixedly mounted at its lower end on a portion of the frame structure and the upper member 116 is adapted to be moved up and down on the lower member 116—A. The lower end portion of the member 116 is slotted and the bifurcated end portion thus formed provided with an inwardly swaged end 121 which is adapted to enter a groove 122 in the member 116—A to prevent the member 116 from sliding downwardly by gravity. When the records in the magazine are to be changed the rear guide member 116 may be manually adjusted downwardly on the member 116—A to thereby afford access and to permit removal and replacement of the records in the magazine. A spring element 123 carried by the upper front guide rod 117 bears on a central exposed portion of the shaft of the upper record transferring roll 41 to yieldably urge the same into contact with a record fed between the transfer rolls, thereby assuring adequate gripping of the record between the rolls.

The mechanism thus far described is operative to reproduce the records in the magazine successively in the order in which they are located in the magazine. Playing normally starts with the record at the top of the magazine and progresses downwardly as the magazine is elevated step by step. When the last or bottom record in the magazine is played and returned to its position in the magazine, the latter is lowered to its starting position so that the uppermost record will again be played.

In some instances it is preferred to permit the preselection of a series of records even though the selected series are not disposed in successive order in the magazine. The selection of a single record has been permitted by arrangement such as shown in my patent, No. 2,087,095. By permitting preselection of more than one record, the utility and commercial value of an automatic phonograph such as herein contemplated is greatly enhanced. According to the present invention there is provided mechanism permitting preselection of any desired number of the records in the mechanism, the preselecting mechanism being wholly mechanical and automatic in its operation.

In the present disclosure, the automatic preselecting mechanism comprises a dial arrangement illustrated in Figure 7 comprising a series of buttons or pins designated 130 and each identified by an associated numeral such as 1 to 18, inclusive. As best shown in Figure 4, the buttons or pins 130 are slidably mounted at their inner ends in a fixed plate 131 and adjacent their outer ends in a plate 132, which is rigidly secured to the inner plate 131 through the adjacent connecting posts such as indicated at 133 in Figure 6. Outside of the plate 132 there is a supplementary plate 134, the plates 132 and 134 being provided with suitable apertures 135 and 136, respectively. The pin or button designating numbers 1 to 18, inclusive, may be imprinted on a transparent sheet of any suitable material and interposed between the plates 132 and 134 so that the numerals may be visible through the openings 136 in the plate 134. The openings 135 in the plate 132 permit light from a suitable source (not shown) to illuminate the button numerals which also constitute record identifying numbers. The plate 134 is yieldably held against the plate 132 by means of springs such as indicated at 142 stretched between the stationary inner plate 131 and the said outer plate 134. The plates 132, 141 and another plate 143 are suitably apertured to permit the spring or springs 142 to pass therethrough and suitable connections are provided between the ends of the springs 142 and the respective plates. As shown in Figure 7, on one side of the mechanism there is provided a plate 137 carrying the record designating numbers 1 to 18, inclusive, and the magazine is equipped with an arrow or indicater 138 which designates on the square 137 which of the records in the magazine is in position to be transferred to the turn table for playing. A suitable index associated with the square 137 is, of course, employed to identify the particular selections.

The selecting pins 130 are normally but yieldingly held in their out-position by means of a helical spring 139 which extends around the group of pins 1 to 18, inclusive, and rests in inner grooves 140 formed in each of the pins. The spring 139 is carried by a centrally located disk 141 which has its periphery suitably slotted to permit the pins to pass therethrough. The periphery of the disk 141 is thus formed of a multiplicity of tongue-like portions. Alternately disposed tongues are offset inwardly as indicated in Figures 4 and 6 to embrace and position the spring 139. The plate 141 is itself positioned by means of the posts 133, the latter being formed in two sections as indicated in Figure 6 and the plate being interposed between the inner and outer sections of the posts. The plate 143 is carried by a hub 144 which is slidably mounted at its inner end in an opening 145 in the plate 131. The hub carries a short shaft 146 which is slidably mounted in a central opening in the outer stationary plate 132. The shaft 146 may further be slidable within the hub 144 but it is provided with an enlarged head 147 at its inner end so that it may not be pulled out of the hub 144. The shaft 146 is provided with a knob 148 for facilitating withdrawal of the shaft 146 and parts actuated thereby incident to the inner end enlargement 147 of the shaft.

To select a pre-determined record, one of the buttons or pins 130 is pressed. Such inward movement of the pin 130 serves to move the disk 143 and its hub 144 inwardly. It will be observed that the pins 130 are so formed as to provide shoulders such as indicated at 149 for engaging the outer face of the disk 143 so as to be capable of transmitting the inward movement of the pins to the said disk and hub. The enlarged inner end portion 150 of the hub 144 is adapted to engage the adjacent end of a pin 151 which abuts at its other end one leg 152 of a U-shaped member 153. The U-shaped member 153 has its other leg 154 somewhat longer than its other leg 152. The member 153 is slidably mounted on an extension of the shaft 100 and a spring 155 positioned on said shaft 100 and compressed between the leg 154, and the adjacent face of the cam member 99 serves to resist said movement of the U-shaped member 153. The extension of the shaft 100 is rotatably supported, in this instance, intermediate the legs of the U-shaped member 153, by means of an upwardly extending frame part 15, as most clearly shown in Figures 6 and 12. The pin 151 extends through an opening 151—A in the hub 156 of an arm 157. The said hub 156 is suitably bored and arranged to be clamped in fixed position on the end portion of the shaft 100 adjacent the selecting pin mechanism as shown. It will be understood that the shaft 100, being secured to the ratchet wheel 103 and cam 99, rotates and that the arm 157 together with a pin 151 rotates with the shaft. The inner end of the pin 151 may, of course, engage the adjacent face of the leg 152 at any point around the shaft 100 so as to transmit the inward movement of the selector pin 130 as above described.

As best shown in Figures 4 and 12, the long leg 154 of the U-shaped member 153 normally engages an edge portion 158 of an inverted U-shaped member 159 which is pivoted at the free ends of its legs as indicated at 160 to suitable lugs formed integrally with the frame structure 15. A coil spring 161 stretched between the member 159 and a conveniently located portion of the frame structure 15 normally tends to swing the member 159 towards the U-shaped member 153 and thus maintains engagement between the ends of the legs 154 and said edge portion 158 of the member 159. When the U-shaped member 153 is moved inwardly as above explained, its leg 154 is moved beyond the end 162 of said edge 158 so as to permit the spring 161 to actuate the member 159. Such movement of the member 159 is transmitted by means of a link 163 to a bail-like member 164 which is pivoted as indicated at 165—165 to frame portions provided for that purpose. The bail-like member 164 has one leg 166 to which the link 163 is connected, and another leg 167 which is, in this instance, somewhat longer than the leg 166. The free end of the leg 167 is connected by means of an adjustable link 168 to a cam lever 169 which is pivotally connected as indicated at 170 to an adjacent frame part. The upper end of the cam lever 169 is provided with a slot 171 which is so shaped as to provide upper and lower cam surfaces 172 and 173 respectively.

When the member 159 rocks under the influence of the spring 161, the lever 169 is correspondingly rocked and the cam surface 173 thereof acts on a lip 174 formed on the free end of the clutch controlling lever 71. The cam edge 173 is so shaped that when the lever 169 is moved as described the clutch lever 71 will be swung upwardly so as to cause the clutch member 23 to engage with a cooperating element 175 which is mounted on the turn table shaft 17. The member 175 is rotatable on the shaft 17 and is normally held in fixed position vertically of the shaft by means of screws such as indicated at 176 which have their inner end portions projected into a groove 177 formed on the shaft 17.

The clutch member 175 is provided with a flange or disk 178 which carries a crank pin 179.

Associated with the disk 178 and crank pin 179 is a lever 180 which is pivoted at one end as indicated at 181 and formed at its other end with a pair of legs 182 and 183. When the disk 178 and its crank pin 179 rotate, the crank pin 179 engages successively the legs 182 and 183 to effect positive rocking of the lever 180. The lever 180 is connected by means of a link 184 to the free end of one arm 185 of a bell crank which includes also an arm indicated at 186. The free ends of the bell crank arms 185 and 186 are further provided with pawls 187 and 188 respectively, which are adapted to engage the teeth of the ratchet wheel 103 to effect step by step rotation thereof. It will be observed that in one direction of movement of the lever 180, the pawl 187 will effect a step of rotation of the ratchet wheel 103 and that in the other direction of movement of the lever 180 the pawl 188 will effect a step of rotation of the said ratchet wheel. By this means rapid upward movement of the magazine is effected so that there is but a short delay caused if, for example, the magazine were located in its lower most position and selection made of a record located near the bottom of the magazine.

During the rotation of the ratchet wheel 103, and consequently of the shaft 100, the arm 157 is also rotated. Such rotation continues until an arm 189 of a bell crank 190 carried by the arm 157 engages the projecting end portion 191 of the inwardly pressed selector pin 130 (see Figures 8 to 12, inclusive). When the bell crank arm 189 engages such an inwardly extending selector pin portion 191, the bell crank 190 is rocked about its pivot 192 so that the other arm 193 will engage an arm 194 of another bell crank 195 which is also pivotally mounted on the arm 157. The other arm 196 of the bell crank 195 will be caused to move inwardly when the selector pin portion 191 is engaged. In its inward movement, the bell crank arm 196 engages the adjacent headed end of a pin 197 which is carried by one of a pair of spaced but rigidly connected disks 198—198.

Referring particularly to Figures 9 and 10, it will be observed that when the member 159 is in its released position under the influence of the spring 161, the periphery of the innermost of said disks 198 is disposed adjacent an inclined or cam-edged portion 199 formed at the adjacent end of the edge portion 158 of said member 159. When the bell crank arm 196 moves inwardly, it shifts the double disk unit 198 inwardly causing the innermost of said disks 198 to engage said cam edge 199 to thereby restore the member 159 to its initial position in which it is shown in Figure 4. When the member 159 is thus restored, the cam lever 169 is returned to its initial position whereby its cam edge 172 effects disengagement of the clutch member 23 from the clutch element 175. Hence the rotation of the disk 178 and its crank pin 179 is stopped so that the record magazine comes to rest at a point determined by the in-pressed selector pin 130.

When the cam lever 169 effects disengagement of the clutch element 23 from the clutch member 175, the clutch member 23 rides downwardly until it comes into operative engagement with the worm wheel 20 so as again to drive the cam shaft 25. Thereupon the lever 62 is permitted to rock in a counter-clockwise direction (as viewed in Figures 2 and 12) to permit lowering of the record centering pin 59 and placement of the pick-up in operative engagement with the record.

The shifting of the member 159 and parts actuated thereby under the influence of the spring 161 is subject to disengagement of a locking device which comprises a bar 200 which is pivoted at one end to the upper end of the arm 166. The opposite end of the bar 200 is provided with an elongated slot 201 which has an enlargement at one end to provide a vertically extending shoulder 202. A stop-pin carried by a frame portion projects into said slot 201 and engages said shoulder 202 thereby normally preventing movement of the bar 200 to the right (as viewed in Figures 2 and 12) as required when the member 159 is actuated by the spring 161. The employment of this locking device permits the setting of the selector pins 130 at any time during the operation of the machine without immediately effecting the continued operation thereof. The locking device is, however, disengaged as soon as the playing of a record is completed and the cam shaft 25 again rotated by the means already described. The releasing means comprises a hook-like element 204 which is rigidly connected to the bar 200 and which is adapted to be engaged by a crank pin 205 projecting from the adjacent face of the cam 110. The arrangement is such that when the cam 110 is at rest during the playing of a record, the crank pin 205 is located immediately under the free end portion of the hook 204. As soon as the cam shaft 25 again begins to rotate, the crank pin 205 engages the end portion of said hook 204 and raises the hook and the slotted end of the bar 200 sufficiently to cause the shoulder 202 to clear the stop-pin 203; then the spring 161 is permitted to rock the member 159 to effect operative engagement of the clutch 23 with the clutch member 175. It will be apparent that as soon as the member 159 is restored to its initial position by the means already explained, the bar 200 will also be restored to its locked position.

When the arm 157 comes to rest incident to the engagement of its bell crank 190 with an inpressed selector pin 130, the selector pin is automatically pushed out or restored to its normal position. The means for resetting the engaged selector pin comprises a lever 206 pivoted intermediate its ends as indicated at 207 on the rotating arm 157 (see Figures 8 to 12, inclusive). As clearly shown in Figure 8, the lever 206 is so located relative to the bell crank arm 189 that when the latter engages the selector pin portion 191, the lever 206 will be aligned with the face of the pin. The opposite end of the lever 206 is provided with a rounded portion 208 which is positioned in a suitable recess 209 formed in pin 210. The pin 210 is carried by a disk 211 which is slidable on the shaft 100, the disk being equipped with guide pins 212 and 213 which fit slidably in suitable openings 212—A and 213—A provided in the hub of the arm 157.

The disk 211 is adapted to be engaged by the free end of the arm 214 of a bell crank 215 which is suitably pivotally mounted and the free end of the other arm 216 of which is connected by a suitable adjustable link 217 to a rock lever 218. The rock lever 218 is pivoted at its lower end to a frame part provided for that purpose and at its upper end carries a roller 219. The roller 219 normally rides on the periphery of the cam 110 and is adapted to be engaged by a supplementary cam element 220 which is carried by the cam disk 110. The cam element 220 is arranged to pull the upper end of the arm 218 toward the cam shaft 25 to thereby cause the bell crank arm 214 to engage the disk 211 and to move the said disk inwardly along the shaft 100. Such movement of the disk 211 is transmitted by its pin 210 to the pivoted arm 206 to cause the outer end thereof to engage the adjacent inner end of the selector pin portion 191 and to thereby restore the selector pin to its initial, or normal, position. When the engaged selector pin is thus restored to its normal position, the arm 157 is freed to again permit rotation of the shaft 100. A spring 229 serves to restore the disk 211 and associated parts to normal positions.

When the ratchet wheel 103 is actuated by the pawl 104 in the event that coins have been deposited to effect the playing of two selections and the depositor makes a selection of only one record, the operation will be as follows. Assuming that the selection of one record is made first and the coins for playing two selections deposited thereafter, the cam shaft 25 will be set into operation promptly after the first coin is deposited. The position of the parts at the beginning of the operation is as shown in Figure 2. The locking bar 200 will be released to permit and cause the clutch 23 to be moved upward into engagement with the member 175 so that the magazine will be rapidly adjusted until the in-pressed pin is engaged by the bell crank 190 on the arm 157. Thereupon the clutch member 23 will be restored to operative engagement with the worm wheel 20 to effect transferring and playing of the record as already described. Upon completion of the playing of the record the latter is returned to the magazine by the arrangement described.

When the in-pressed selector pin was engaged the mechanism already described operated to restore the pin to its normal position and the spring 155, acting through the U-shaped member 153 and the pin 151 to press the hub 144 and the disk 143 outwardly to normal position. Hence the pre-selecting mechanism is in normal inoperative position and the continued operation of the motor as effected by the deposition of the second coin continues to drive the cam shaft 25 to effect upward movement of the magazine one step so as to play the next lower record.

In the event that the depositor of two coins presses in two successive selector pins, the operation is substantially the same as above described except that the member 178 will not be actuated. This follows from the fact that when the bell crank arm 189 of the arm 157 engages the second selector pin, it immediately returns the two disk members 198 to the position shown in Figure 10 which prevents the member 159 from rocking to effect operation of the member 178. During the first few degrees of rotation of the cam 110, the pin 205 engages the hooked member 204 to lift the locking bar 200, but such disengagement of locking bar from the stop-pin 203 does not result in movement of the member 159 since it is, at that time, being held in normal position by the innermost disk 198. The locking engagement between the bar 200 and the stop-pin 203 is restored almost immediately so that by the time the second engaging selector pin is pushed outwardly as an incident to the operation of the cam 220, and resulting return of the connected disks 198 to normal position, the member 159 will be again held in normal position by the locking bar 200. The connected disks 198—198 are slidable on the shaft 100 and are normally pulled by a spring 221 toward their normal out position. It will be understood that the U-shaped member 153 does not rotate but that the two disks 198, the disk 211 and the arm 157 rotate in unison with the shaft 100. This results from the inter-connection of the said parts by the pins 151, 197, 212 and 213.

When the last of the in-pressed selector pins is restored, the hub 144 and the disk 143 are also returned to initial position under the force of the spring 155 which acts through the member 153 and the pin 151 against the inner end of the said hub. It will, however, be understood that so long as any one selector pin remains pressed in, the hub 144 and the disk 143 will not be returned to initial position. This is due to the fact that the spring 155 is not strong enough to overcome the resistance of the pin encircling spring 139 which acts through the pins 130 to resist outward movement of the disk 143. However, if the operator of the machine desires to restore any in-pressed pin, he may do so by pulling outward on the knob 148.

In the event that a person deposits two or more coins and presses in two pins which are related to records not in adjacent pockets in the magazine, the operation is as follows. Selection of the first record occurs as already described. When the playing of the first record is completed and the first record returned to the magazine, the locking bar 200 will be released from the stop-pin 203 so as to permit the spring 161 to actuate the member 159 and thereby effect operation of the member 178 with consequent movement of the record magazine. Such movement of the magazine continues until the bell crank arm 189 carried by the arm 157 engages the second selector pin and stops the movement of the magazine with the selected record in position to be transferred to the turn table. Upon completion of the playing of the second record, it is returned to the magazine and the latter shifted one step in the usual manner so as to be ready for the playing of another selection.

From the foregoing description it will be understood that the record transferring magazine is moved up and down through its full path of movement, stopping only at the places determined by the in-pressed selector pins, so long as any thereof are pressed in. If no pins are pressed in, then the magazine will stop automatically and will play each record therein in the order in which they are placed in the magazine.

The disk 211 is provided with an edgewise extending tooth 222 which is adapted to engage a finger 223 extending from the member 159. When the tooth 222 engages the said finger 223, the member 159 is thereby automatically returned to its normal position wherein it is normally retained by the locking bar 200. In the event that for any reason the arm 157 and its associated mechanism fail to operate in its proper way, the tooth 222 on the disk 211 would serve automatically to restore the member 159 and thereby prevent continuous feeding of the magazine up and down. The tooth 222 thus constitutes what might be called a safety device for stopping the shifting of the record magazine in the event that the selector pins 130 fail to do so if the member 178 is being driven.

To prevent the member 178 from being driven whenever the record shifting member 33 is in its in-position, that is when a record is being transferred from the magazine to the turn table and whenever a record is on the turn table, and also when the magazine is locked against vertical movement by the dog 111, there is provided a pin 224 on the link 123 for engaging a finger 225 carried by the member 159. The finger 225 is pivoted as indicated at 226 on the member 159 and is adapted to engage a stop-pin 227 carried by another portion of said member 159. The finger 225 is normally yieldingly held away from said stop-pin 227 by means of a helical spring 228. It will be observed that when the member 124 is moved to its extreme left-hand position, the pin 224 thereon will engage the upper end portion of the finger 225 to swing it into engagement with the stop-pin 227. Hence when the member 124 is in its extreme left-hand position, the member 159 is held against movement under the influence of the spring 161.

The described mechanism is completely automatic in its operation and permits a patron to select only such of the records in the magazine as suit his fancy. The mechanism involves parts which are of relatively simple construction and which are of such size that they are durable and easy to make. The mechanism is flexible so that the patron may change his selections at will. For example, if the patron wishes to substitute his selection for only one previously made selection, he may pull out only the selector pin not desired and substitute the desired one. If, however, he has pressed in a number of pins and desires to make an entirely different selection he may restore all of the pins by pulling outwardly on the knob 148 which, acting through the plate 143, will simultaneously restore all of the in-pressed selector pins.

I claim:

1. In an automatic phonograph, the combination of a turn table, a record magazine, means for relatively shifting said turn table and magazine to effect alignment of said turn table respectively with the records in the magazine, a clutch for controlling said shifting operation, means for effecting transfer of the records from and to said magazine to and from said turn table, and selecting means for causing said record transfer means to transfer selected records, said selecting means comprising a plurality of movable selector members respectively related to predetermined records in the magazine, said members being movable from normal, inoperative position to operative position, a driven shaft operably connected to said means for relatively shifting said turn table and magazine, an arm carried by said shaft so as to rotate therewith, a member carried by said arm for engaging one of said selector members when adjusted to operative position, means operatively connecting said member and said clutch for effecting disengagement of the latter upon engagement of said member with such selector member to stop relative shifting of said turn table and magazine with the turn table and the selected record in aligned relation to permit the transfer of such record to said turn table.

2. In an automatic phonograph, the combination of a turn table, a record magazine shiftable vertically relative to the turn table to position records in the magazine for transference to said turn table, means for effecting said transference of the records, means for effecting said shifting of the magazine including a clutch for controlling the operation of said magazine-moving means, and means for selecting the record to be transferred from the magazine to the turn table, said means comprising a plurality of selector members respectively related to a record in the magazine, said members being movable from normal, inoperative position to operative position, a rotating arm operatively connected to said magazine-moving means, a movable element carried by said rotating arm and adapted to engage one of said selector members when adjusted to operative position and to be thereby moved, means connecting said movable element with said clutch for disengaging the latter to stop movement of said magazine with the selected record in position for transference from said magazine to said turn table.

3. In an automatic phonograph, the combination of a turn table, a record magazine shiftable vertically relative to the turn table to position records in the magazine for transference to said turn table, means for effecting said transference of the records, means for effecting said shifting of the magazine including a clutch for controlling the operation of said magazine-moving means, and means for selecting the record to be transferred from the magazine to the turn table, said means comprising a plurality of selector members respectively related to a record in the magazine, said members being movable from normal, inoperative position to operative position, a rotating arm operatively connected to said magazine-moving means, a movable element carried by said rotating arm and adapted to engage one of said selector members when adjusted to operative position and to be thereby moved, means connecting said movable element with said clutch for disengaging the latter to stop movement of said magazine with the selected record in position for transference from said magazine to said turn table, and means carried by said arm for restoring said selector member to inoperative position.

4. In an automatic phonograph, the combination of a turn table, a vertically shiftable record magazine, means including a ratchet wheel for effecting vertical shifting of said magazine, a rotatably driven shaft, crank pin means carried by said shaft for effecting step-by-step rotation of said ratchet wheel, a link having an operative connection with said crank pin means so as to be reciprocated as an incident to the rotation of said crank pin means, pawl means connected to said link for effecting rotation of said ratchet wheel incident to the movement of said link in both directions, a clutch for controlling the operation of said crank pin means, a plurality of selector members respectively related to the records in said magazine, and means adapted to be actuated by said selector members for effecting disengagement of said clutch to stop the rotation of said ratchet wheel when the selected record in the magazine is in position to be transferred from the magazine to the turn table.

5. In an automatic phonograph, the combination of a turn table, a vertically shiftable record magazine, means including a ratchet wheel for effecting vertical shifting of said magazine, a rotatably driven shaft, crank pin means carried by said shaft for effecting step-by-step rotation of said ratchet wheel, a link having an operative connection with said crank pin means so as to be reciprocated as an incident to the rotation of said crank pin means, pawl means connected to said link for effecting rotation of said ratchet wheel incident to the movement of said link in both directions, a clutch for controlling the operation of said crank pin means, a plurality of selector members respectively related to the records in said magazine, means adapted to be actuated by said selector members for effecting disengagement of said clutch to stop the rotation of said ratchet wheel when the selected record in the magazine is in position to be transferred from the magazine to the turn table, and means for effecting transference of the selected record from the magazine to the turn table upon disengagement of said clutch.

6. In an automatic phonograph of the class described, the combination of a turn table, a vertically movable record magazine, cam means for effecting step-by-step upward movement of said magazine for successive playing of the records in the magazine, auxiliary means for independently effecting upward movement of said magazine to effect the playing of a selected record, a plurality of selector members respectively associated with the records in the magazine, said selector members being movable from normal, inactive position to operative position, means actuated as an incident to the adjustment of one of said selector members to operative position for rendering said cam means inoperative and effecting operation of said auxiliary means, means operatively connected with said magazine for movement through the positions occupied by said selector members when adjusted to operative position and adapted to engage one of said selector members when in said operative position to be thereby moved, means actuated by said last mentioned movable member for stopping the operation of said auxiliary means to thereby stop the vertical movement of the magazine when the selected record is in position for transference to said turn table.

7. In an automatic phonograph of the class described, the combination of a turn table, a vertically movable record magazine, cam means for effecting step-by-step upward movement of said magazine for successive playing of the records in the magazine, auxiliary means for independently effecting upward movement of said magazine to effect the playing of a selected record, a plurality of selector members respectively associated with the records in the magazine, said selector members being movable from normal, inactive position to operative position, means actuated as an incident to the adjustment of one of said selector members to operative position for rendering said cam means inoperative and effecting operation of said auxiliary means, means operatively connected with said magazine for movement through the positions occupied by said selector member when adjusted to operative position and adapted to engage one of said selector members when in said operative position to be thereby moved, means actuated by said last mentioned movable member for stopping the operation of said auxiliary means to thereby stop the vertical movement of the magazine when the selected record is in position for transference to said turn table, and lock means for preventing operation of said auxiliary means during the playing and transferring of a record.

8. In an automatic phonograph, the combination of a turn table, a vertically movable record magazine, cam means for effecting step-by-step movement of said magazine for effecting the successive playing of the successively arranged records in the magazine and auxiliary means operative independently of said cam means for effecting movement of said magazine to cause the playing of a selected record, said auxiliary means comprising a crank pin, a pivotally mounted arm having a bifurcated end portion straddling said crank pin so as to be rocked incident to the rotation of the crank pin, a link connected at one end to said arm so as to be reciprocated as an incident to the rocking thereof, a pawl pivotally connected to the other end of said link, a pivotally mounted bell crank having the free end of one arm also pivotally connected to said other end of said link, a second pawl pivotally connected to the free end of the other arm of said bell crank, a ratchet wheel adapted to be advanced one step of movement by each of said pawls as an incident to the movement of said link in each direction, manually operable means for effecting rotation of said crank pin, and means for automatically stopping the rotation of said crank pin when the magazine is shifted to position the selected record for transference to the turn table.

9. In an automatic phonograph, the combination of a turn table, a vertically adjustable record magazine, means for effecting rotation of said turn table comprising a driven shaft, cam means for effecting step-by-step movement of said record magazine for effecting successive playing of the successively arranged records in said magazine, auxiliary means operable independently of said cam means for effecting extended movement of said magazine, independent devices rotatably mounted on said driven shaft respectively for actuating said cam means and said auxiliary means, a clutch member keyed to said driven shaft and movable thereon so as to selectively effect operation of said cam means and said auxiliary means, manually adjustable selector means for shifting said clutch member to effect operation of said auxiliary means, and means controlled by said selector means for automatically effecting disengagement of said clutch member from said auxiliary means when the selected record is positioned for transference to said turn table.

10. In an automatic phonograph, the combination of a turn table, a record magazine for supporting a plurality of records in vertically spaced relation, said magazine being vertically movably mounted so as to permit adjustment of the magazine to position the various records therein for transference to said turn table, a rotatably driven shaft, cam means for effecting step-by-step adjustment of said record magazine for successive playing of the records therein in the successive relation in which they are arranged, a clutch member keyed to said driven shaft so as to be movable longitudinally of the shaft while rotating therewith, means adapted to be actuated by said clutch member when in one position for effecting operation of said cam means, auxiliary means for effecting extended movement of said magazine to position a selected record for transference to said turn table, means adapted to be actuated by said clutch member when in a second position on said shaft for operating said auxiliary means, a cam device for controlling the position of said clutch member, a plurality of manually adjustable selector members respectively related to the records in said magazine, said selector members being adjustable from normal, inoperative position to operative position, means common to all of said selector members and adapted to be actuated by each thereof for moving said cam device to effect operation of said auxiliary means, and means adapted to be actuated by engagement with one of said selector members when in operative position to again move said cam device to stop the operation of said auxiliary means when the selected record is positioned for transference to the turn table.

11. In an automatic phonograph, the combination of a turn table, a record magazine for supporting a plurality of records in vertically spaced relation, said magazine being vertically movably mounted so as to permit adjustment of the magazine to position the various records therein for transference to said turn table, a rotatably driven shaft, cam means for effecting step-by-step adjustment of said record magazine for successive playing of the records therein in the successive relation in which they are arranged, a clutch member keyed to said driven shaft so as to be movable longitudinally of the shaft while rotating therewith, means adapted to be actuated by said clutch member when in one position for effecting operation of said cam means, auxiliary means for effecting extended movement of said magazine to position a selected record for transference to said turn table, means adapted to be actuated by said clutch member when in a second position on said shaft for operating said auxiliary means, a cam device for controlling the position of said clutch member, a plurality of manually adjustable selector members respectively related to the records in said magazine, said selector members being adjustable from normal, inoperative position to operative position, means common to all of said selector members and adapted to be actuated by each thereof for moving said cam device to effect operation of said auxiliary means, means adapted to be actuated by engagement with one of said selector members when in operative position to again move said cam device to stop the operation of said auxiliary means when the selected record is positioned for transference to the turn table, and lock means for preventing actuation of said clutch controlling cam device during the playing of a record.

12. In an automatic phonograph, the combination of a turn table, a record magazine for supporting a plurality of records in vertically spaced relation, said magazine being vertically movably mounted so as to permit adjustment of the magazine to position the various records therein for transference to said turn table, means for locking said magazine against vertical movement during the transferring and playing of a record, a rotatably driven shaft, cam means for effecting step-by-step adjustment of said record magazine for successive playing of the records therein in the successive relation in which they are arranged, a clutch member keyed to said driven shaft so as to be movable longitudinally of the shaft while rotating therewith, means adapted to be actuated by said clutch member when in one position for effecting operation of said cam means, auxiliary means for effecting extended movement of said magazine to position a selected record for transference to said turn table, means adapted to be actuated by said clutch member when in a second position on said shaft for operating said auxiliary means, a cam device for controlling the position of said clutch member, a plurality of manually adjustable selector members respectively related to the records in said magazine, said selector members being adjustable from normal, inoperative position to operative position, means common to all of said selector members and adapted to be actuated by each thereof for moving said cam device to effect operation of said auxiliary means, means adapted to be actuated by engagement with one of said selector members when in operative position to again move said cam device to stop the operation of said auxiliary means when the selected record is positioned for transference to the turn table, and lock means for preventing movement of said clutch controlling cam device when the magazine is locked against vertical shifting.

13. In an automatic phonograph of the class described, selector mechanism comprising a shaft connected with a rotatable element of the magazine shifting mechanism of the phonograph, an arm secured to said shaft for rotation therewith, a plurality of independently movable selector members disposed in substantially axially parallel relation to said driven shaft, an element movably mounted on said arm for engaging one of said selector members as an incident to rotation of said arm and shaft, a member mounted on said shaft for sliding movement longitudinally of the shaft, a second member also mounted on said shaft for sliding movement longitudinally thereof, means for effecting longitudinal movement of said first mentioned member as an incident to manual adjustment of one of said selector members, means for effecting longitudinal movement of said second member as an incident to engagement of said arm element with one of said selector members, and a pivotally mounted member normally held in predetermined position by said first mentioned slidable member, means for effecting rocking movement of said pivoted member after said first mentioned slidable member is moved longitudinally, and means whereby movement of said second slidable member is operative to restore said pivoted member to its initial position.

14. In an automatic phonograph of the class described, selector mechanism comprising a shaft connected with a rotatable element of the magazine shifting mechanism of the phonograph, an arm secured to said shaft for rotation therewith, a plurality of independently movable selector members disposed in substantially axially parallel relation to said driven shaft, and adapted to be moved longitudinally of said shaft from normal inoperative position to operative position, an element movably mounted on said arm for engaging one of said selector members as an incident to rotation of said arm and shaft, a member mounted on said shaft for sliding movement longitudinally of the shaft, a second member also mounted on said shaft for sliding movement longitudinally thereof, means for effecting longitudinal movement of said first mentioned member as an incident to manual adjustment of one of said selector members, means for effecting longitudinal movement of said second member as an incident to engagement of said arm element with one of said selector members, and a pivotally mounted member normally held in predetermined position by said first mentioned slidable member, means for effecting rocking movement of said pivoted member after said first mentioned slidable member is moved longitudinally, means whereby movement of said second slidable member is operative to restore said pivoted member to its initial position, a third member mounted on said shaft for movement longitudinally thereof, means carried by said arm and connected with said third member for effecting restoration of said selector member to inoperative position after engagement thereof by said arm element, and means for effecting longitudinal movement of said third member to effect such restoration of said selector member.

EMIL C. MUELLER.